US009817182B2

United States Patent
Choi et al.

(10) Patent No.: US 9,817,182 B2
(45) Date of Patent: Nov. 14, 2017

(54) BACKLIGHT UNIT AND DISPLAY DEVICE INCLUDING THE SAME

(71) Applicant: Samsung Display Co., Ltd., Yongin-Si, Gyeonggi-Do (KR)

(72) Inventors: Kwang-wook Choi, Osan-si (KR); Junwoo You, Seongnam-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 84 days.

(21) Appl. No.: 15/048,047

(22) Filed: Feb. 19, 2016

(65) Prior Publication Data
US 2016/0363721 A1    Dec. 15, 2016

(30) Foreign Application Priority Data

Jun. 11, 2015  (KR) .................. 10-2015-0082748

(51) Int. Cl.
*F21V 8/00*   (2006.01)
*F21V 15/04*  (2006.01)

(52) U.S. Cl.
CPC .......... *G02B 6/0091* (2013.01); *G02B 6/0088* (2013.01); *G02B 6/0025* (2013.01); *G02B 6/0055* (2013.01); *G02B 6/0093* (2013.01)

(58) Field of Classification Search
CPC .. G02B 6/0025; G02B 6/0055; G02B 6/0081; G02B 6/0086; G02B 6/0088; G02B 6/0091; G02B 6/0093
See application file for complete search history.

(56) References Cited

U.S. PATENT DOCUMENTS

| 8,531,624 | B2* | 9/2013 | Que | G02B 6/0086 349/58 |
| 8,740,446 | B2* | 6/2014 | Huang | G02B 6/0088 362/632 |
| 8,913,211 | B2* | 12/2014 | Park | G02B 6/0088 349/58 |
| 8,964,142 | B2* | 2/2015 | Zhang | G02B 6/0088 349/58 |

(Continued)

FOREIGN PATENT DOCUMENTS

| KR | 1020030066914 A | 8/2003 |
| KR | 1020100061326 A | 6/2010 |

(Continued)

*Primary Examiner* — Alan Cariaso
(74) *Attorney, Agent, or Firm* — Cantor Colburn LLP (57) ABSTRACT

A display device includes a display panel, a light source which generates light, a light guide plate which receives the light and guides the light to the display panel, the light guide plate defining a side surface thereof, an accommodating member accommodating the light source and the light guide plate therein, the accommodating member including a sidewall, and a fixing member in plural between the sidewall of the accommodating member and the side surface of the light guide plate. The fixing member defines a supporting portion thereof contacting the side surface of the light guide plate, fixing portions fixed to the sidewall of the accommodating member and spaced apart from each other, and a connecting portion provided in plural and connecting an end among opposing ends of the supporting portion to a fixing portion among the fixing portions, the fixing portion forming an acute angle with the connecting portion.

16 Claims, 5 Drawing Sheets

(56) References Cited

U.S. PATENT DOCUMENTS

| | | | |
|---|---|---|---|
| 8,985,801 B2 | 3/2015 | Wu et al. | |
| 9,310,550 B2* | 4/2016 | He | G02B 6/0088 |
| 9,366,805 B2* | 6/2016 | Park | G02F 1/133608 |
| 9,671,549 B2* | 6/2017 | Que | G02B 6/0088 |
| 2012/0236228 A1* | 9/2012 | Tang | G02F 1/133615 |
| | | | 349/61 |

FOREIGN PATENT DOCUMENTS

| | | |
|---|---|---|
| KR | 1020110070583 A | 6/2011 |
| KR | 10-1096656 A | 12/2011 |
| KR | 10-1486311 A | 1/2015 |
| KR | 1020150001156 A | 1/2015 |

\* cited by examiner

BACKLIGHT UNIT AND DISPLAY DEVICE INCLUDING THE SAME

This application claims priority to Korean Patent Application No. 10-2015-0082748, filed on Jun. 11, 2015, and all the benefits accruing therefrom under 35 U.S.C. §119, the contents of which are hereby incorporated by reference.

BACKGROUND

1. Field

The invention relates to a display device. More particularly, the invention relates to a display device which reduces or effectively prevents movement of a light guide plate therein and has improved display quality.

2. Description of the Related Art

In general, a display device includes a display panel which displays an image using light and a backlight unit which generates and provides the light to the display panel. The display panel controls a transmittance therethrough of the light provided from the backlight unit to display the image.

The backlight unit is classified into an edge-illumination type backlight unit which provides the light to a side surface of the display panel and a direct-illumination type backlight unit which provides the light to a lower portion of the display panel. The edge-illumination type backlight unit includes a light source which generates and emits the light and a light guide plate which receives the light from the light source and guides a direction in which the received light travels. The light source is disposed adjacent to a side of the light guide plate and the light guide plate guides the light provided from the light source to the display panel.

The backlight unit and the display panel of the display device are accommodated in and fixed by a bottom chassis and a top chassis of the display device. The bottom chassis and the top chassis of the display device protect the backlight unit and the display panel from external impacts thereto.

SUMMARY

One or more exemplary embodiment provides a display device which reduces or effectively prevents movement of a light guide plate therein and has improved display quality.

An exemplary embodiment of the invention provides a display device including a display panel which displays an image using a light, a light source which generates the light, a light guide plate which receives the light from the light source and guides the received light to the display panel, the light guide plate defining a side surface thereof in plural, an accommodating member which accommodates the light source and the light guide plate therein, the accommodating member including a sidewall provided in plural, and a fixing member provided in plural between the sidewall of the accommodating member and the side surface of the light guide plate. The fixing member defines a supporting portion thereof which contacts the side surface of the light guide plate, a plurality of fixing portions thereof which is fixed to the sidewall of the accommodating member and disposed to be spaced apart from each other, and a connecting portion thereof which is provided in plural and connects an end among opposing ends of the supporting portion to a fixing portion among the fixing portions, respectively. An acute angle is formed between the fixing portion and the connecting portion which connects the end of the supporting portion to the fixing portion.

The fixing portion, the connecting portion, and the supporting portion may be sequentially connected to each other in a zigzag shape.

A distance between the fixing portions spaced apart from each other may be smaller than a distance between the opposing ends of the supporting portion.

The accommodating member may further include a bottom portion extended from the plural sidewalls thereof, the light source is disposed between the light guide plate and a first sidewall of the accommodating member, and the fixing members are disposed between the light guide plate and a second sidewall of the accommodating member opposing the first sidewall thereof.

The supporting portion may have a convex curved surface shape from the second sidewall of the accommodating member toward the side surface of the light guide plate.

The fixing member may further define a sub-connecting portion which connects the connecting portion and the supporting portion to each other, and the connecting portion and the sub-connecting portion may be connected to each other in a zigzag shape.

The fixing member may include a metal material.

The fixing portion may be fixed to the second sidewall of the accommodating member by a coupling member which penetrates through the second sidewall of the accommodating member.

The light source disposed between the first sidewall of the accommodating member and the light guide plate may include a light source substrate disposed lengthwise adjacent to a side surface of the light guide plate opposite to the side surface at which the fixing member is disposed.

The display device may further include a plurality of stoppers which is disposed respectively between the light source substrate and the opposing ends of the light guide plate and maintains a distance between the light source and the light guide plate.

The display device may further include a reflection sheet which is disposed between the light guide plate and the bottom portion of the accommodating member and reflects light provided from the light guide plate, and an optical member which is disposed between the light guide plate and the display panel, diffuses and condenses the light provided from the light guide plate, and provides the diffused and condensed light to the display panel.

An exemplary embodiment of the invention provides a display device including a display panel which displays an image using a light, a light source which generates the light, a light guide plate which receives the light from the light source and guides the received light to the display panel, the light guide plate defining a side surface thereof provided in plural, an accommodating member which accommodates the light source and the light guide plate therein, a mold frame which is disposed under the display panel and has a frame shape, the mold frame including a sidewall provided in plural disposed inside the accommodating member, and a fixing member provided in plural between an inner surface of the sidewall of the mold frame and the side surface of the light guide plate. The fixing member defines a supporting portion thereof which contacts the side surface of the light guide plate, a plurality of fixing portions thereof which is fixed to the inner surface of the sidewall of the mold frame and disposed to be spaced apart from each other, and a connecting portion thereof which connects an end among opposing ends of the supporting portion to a fixing portion among the fixing portions, respectively. An acute angle is formed between the fixing portion and the connecting portion which connects the end of the supporting portion to the fixing portion.

According to one or more exemplary embodiment described above, the display device may reduce or effectively prevent movement of the light guide plate therein and improve a display quality thereof.

BRIEF DESCRIPTION OF THE DRAWINGS

The above and other advantages of the invention will become readily apparent by reference to the following detailed description when considered in conjunction with the accompanying drawings where.

DETAILED DESCRIPTION

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout.

As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the disclosure. As used herein, the singular forms, "a," "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, the invention will be explained in detail with reference to the accompanying drawings.

Figure 1:
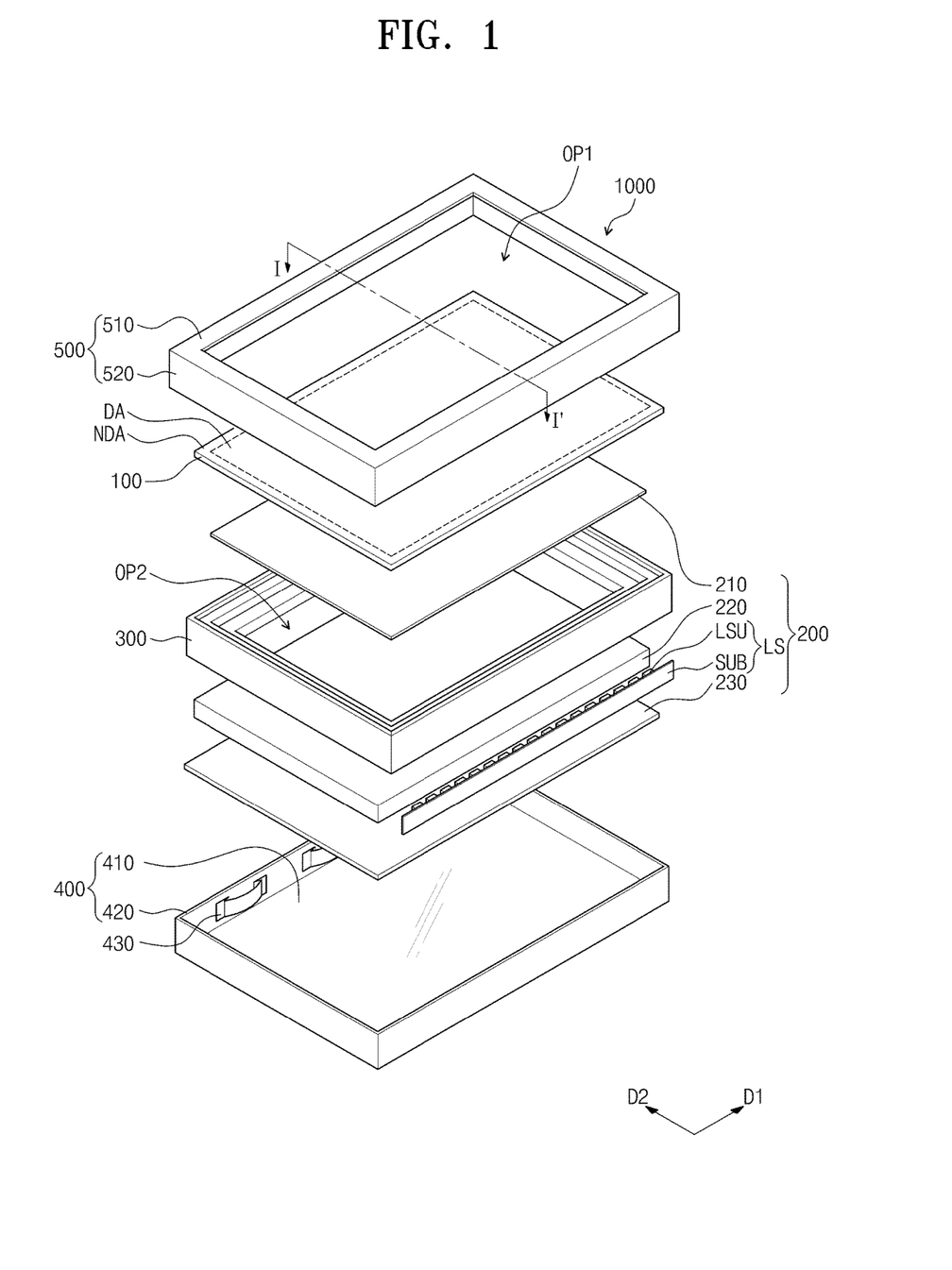
FIG. 1 is an exploded perspective view showing an exemplary embodiment of a display device according to the invention.

FIG. 1 is an exploded perspective view showing an exemplary embodiment of a display device 1000 according to the invention.

Referring to FIG. 1, the display device 1000 includes a display panel 100, a backlight unit 200, a mold frame 300, an accommodating member 400, a fixing member 430 provided in plural and a covering member 500. The mold frame 300 and the accommodating member 400 may be considered portions of a collective receiving container in which components of the display device 1000 are received.

The display panel 100 may be, but is not limited to, a liquid crystal display panel. That is, the display panel 100 includes a plurality of pixels (not shown) displaying an image using a light provided from the backlight unit 200. Although not shown in figures, the display panel 100 may include a display substrate (not shown) in which the pixels (not shown) are disposed on a base substrate, and an opposite substrate (not shown) facing the display substrate. The display panel 100 may include a liquid crystal layer (not shown) interposed between the display substrate (not shown) and the opposite substrate (not shown). The display panel 100 includes a display area DA inn which the pixels (not shown) are disposed and an image is displayed, and a non-display area NDA surrounding the display area DA when viewed in a plan view and in which an image is not displayed. The pixels (not shown) may not be disposed in the non-display area NDA.

The backlight unit 200 is disposed at a rear side of the display panel 100 and provides the light to the display panel 100.

The backlight unit 200 may be, but is not limited to, an edge-illumination type backlight unit. The backlight unit 200 includes a light source LS, an optical member 210, a light guide plate 220 and a reflection sheet 230.

The light source LS is disposed adjacent to one side of the light guide plate 220 in a second direction D2. The reflection sheet 230 is disposed under the light guide plate 220 and the optical member 210 is disposed on (e.g., above) the light guide plate 220. The display panel 100 is disposed on (e.g., above) the optical member 220.

The light source LS generates the light and provides the light to the light guide plate 220. The light source LS includes a light source substrate SUB and a light source unit LSU which is provided in plural mounted on the light source substrate SUB.

The light source substrate SUB lengthwise extends in a first direction D1. The light source units LSU are disposed on one side surface of the light source substrate SUB in the second direction D2. The light source units LSU are arranged on the one side surface of the light source substrate SUB at regular intervals in the first direction D1.

The light source units LSU generate the light. The light generated by the light source units LSU is provided to the light guide plate 220.

The light guide plate 220 guides the light provided from the light source units LSU to travel in upward direction where the display panel 100 is disposed. Although not shown in figures, a pattern or a groove may be disposed or formed in a lower surface of the light guide plate 220 facing the reflection sheet 230 to scatter the light incident thereto, and a pattern having a lens shape or a groove may be disposed or formed in an upper surface of the light guide plate 220 facing the display panel 100. The light guide plate 220 may define a light exiting (upper) surface thereof, a rear or opposing (lower) surface thereof and side surfaces thereof which connect the light exiting and rear surfaces to each other.

The light guide plate 220 includes a material having a relatively high light transmissivity in a visible ray wavelength range. In an exemplary embodiment, the light guide plate 220 may include polymethylmethacrylate ("PMMA").

The optical member 210 is disposed on the light guide plate 220. The light guided to and traveling in the upward direction by the light guide plate 220 is diffused and condensed by the optical member 210, and then provided to the display panel 100.

The reflection plate 230 is disposed under the light guide plate 220. The reflection plate 230 reflects the light leaking through the lower surface of the light guide plate 220 to be re-directed in the upward direction. The reflection plate 230 includes a material that reflects the light. In an exemplary embodiment, the reflection plate 230 may include aluminum and/or polyethylene terephthalate ("PET").

The mold frame 300 is disposed on the light guide plate 220. The mold frame 300 has a predetermined frame shape. The mold frame 300 is disposed on the light guide plate 220 to correspond to an edge portion of the light guide plate 220. The mold frame 300 maintains positions of the light guide plate 220, the optical member 210 and the display panel 100 within the display device 1000 and relative to each other.

The accommodating member 400 includes a bottom portion 410 and a sidewall 420 provided in plural connected to the bottom portion 410. The accommodating member 400 may define each of the bottom portion 410 and the sidewalls 420. One of the bottom portion 410 and the sidewalls 420 may extend to define the other one of the bottom portion 410 and the sidewalls 420. The accommodating member 400 accommodates the backlight unit 200 therein. In the exemplary embodiment, the light source LS is disposed on an inside surface of a sidewall among the sidewalls 420 of the accommodating member 400.

Among the sidewalls 420 of the accommodating member 400, the fixing member 430 may be arranged on an inside surface of a sidewall 420 facing the sidewall 420 on which the light source LS is disposed.

The fixing member 430 is disposed between the sidewall 420 on which the fixing member 430 is disposed and a side surface of the light guide plate 220 adjacent to the sidewall 420 on which the fixing member 430 is disposed. The fixing member 430 reduces or effectively prevents movement of the light guide plate 220 within the display device 100 and maintains a distance between the light guide plate 220 and the light source unit LSU in the second direction D2.

Details on the fixing member 430 will be described with reference to FIGS. 2 to 5. The covering member 500 is disposed on the display panel 100. The covering member 500 has a frame shape. The covering member 500 includes a first covering portion 510 disposed on the display panel 100 to cover the non-display area NDA of the display panel 100 and a second covering portion 520 defining a sidewall of the covering member 500. A first opening OP1 of the covering member 500 is defined by the first covering portion 510 to expose the display area DA of the display panel 100.

The second covering portion 520 is connected to an outer edge of the first covering portion 510 and extends downward from the first covering portion 510. That is, the first covering portion 510 is arranged substantially perpendicular to the second covering portion 520. The second covering portion 520 surrounds outside surfaces of the accommodating member 400. The covering portion 500 may define each of the first covering portion 510 and the second covering portion 520. One of the first covering portion 510 and the second covering portion 520 may extend to define the other one of the first covering portion 510 and the second covering portion 520.

Figure 2:
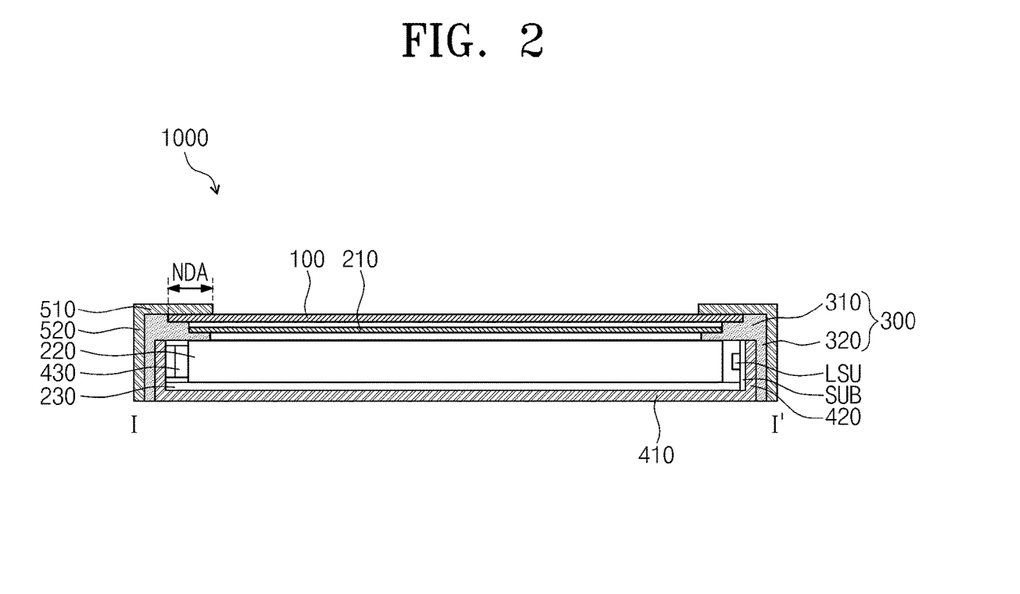
FIG. 2 is a cross-sectional view of the display device taken along line I-I' of FIG. 1.
Figure 3A:
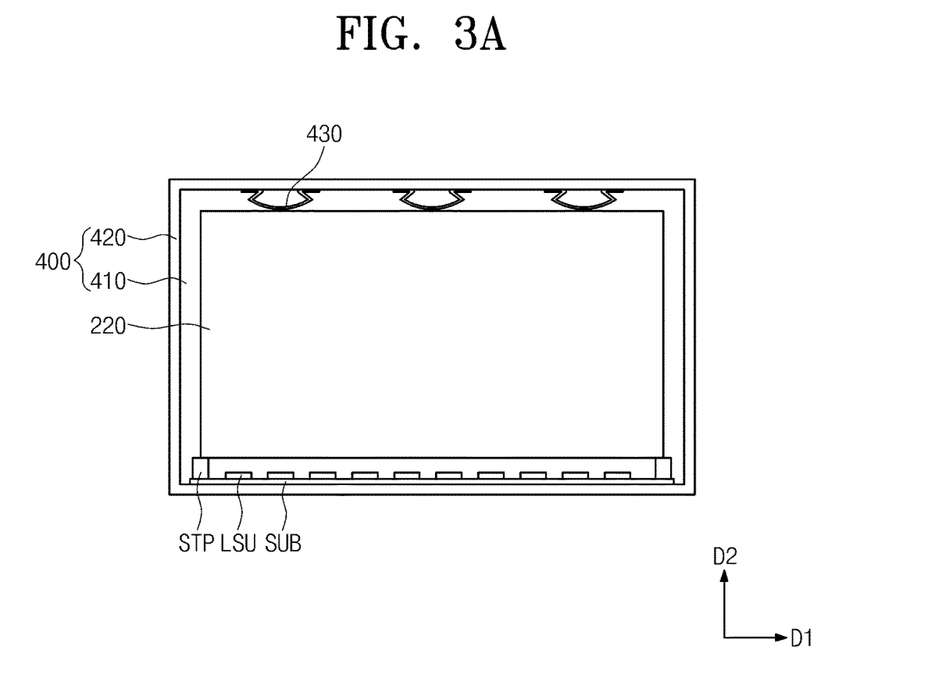
FIGS. 3A and 3B are top plan views respectively showing exemplary embodiments of an accommodating member and a light guide plate of a display device according to the invention.
Figure 3B:
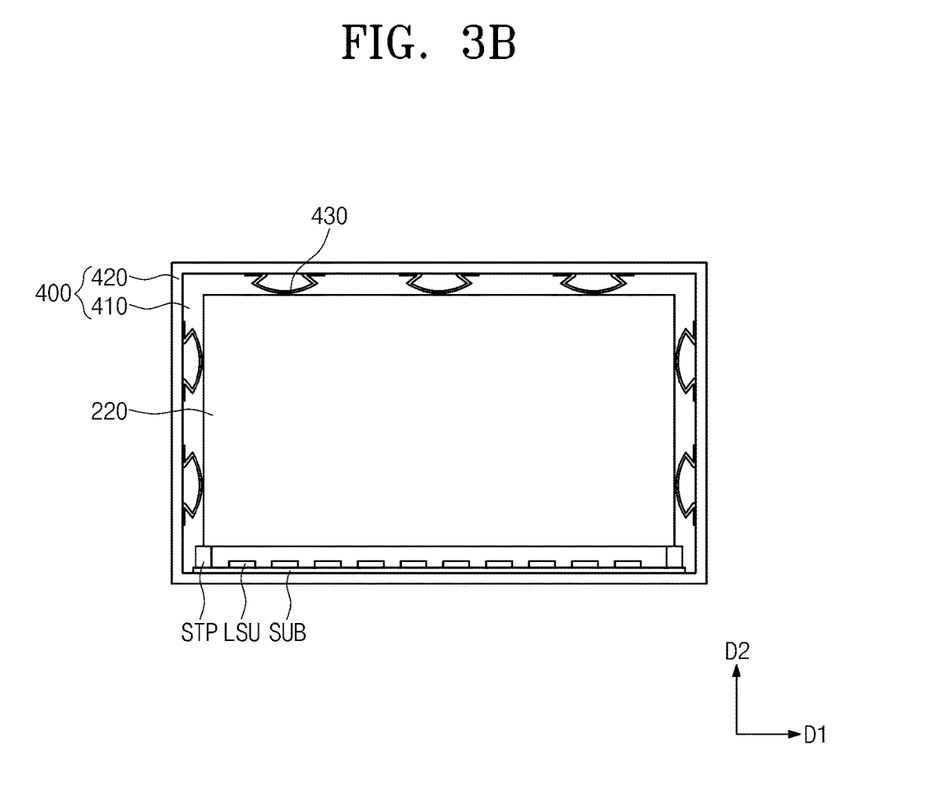

FIG. 2 is a cross-sectional view of the display device 1000 taken along line I-I' of FIG. 1, and FIGS. 3A and 3B are top plan views respectively showing exemplary embodiments of the accommodating member and the light guide plate according to the invention.

Referring to FIGS. 2 and 3A, the non-display area NDA of the display panel 100 is disposed between the first covering portion 510 and the mold frame 300 and held therebetween. In detail, an upper surface of the non-display area NDA of the display panel 100 makes contact with the first covering portion 510 of the covering member 500 and a lower surface of the non-display area NDA of the display panel 100 makes contact with the mold frame 300 such that the display panel 100 is fixed between the first covering portion 510 and the mold frame 300.

The mold frame 300 has the frame shape surrounding edge portions of the optical member 210 and the display panel 100. The mold frame 300 defines a second opening OP2 inside the frame shape thereof. The mold frame 300 is disposed to correspond to the edge portion of the upper surface of the light guide plate 220 and fixes the light guide plate 220 to the bottom portion 410 of the accommodating member 400 such that the light guide plate 220 does not move in the upper and lower directions (e.g., a third direction orthogonal to both the first and second directions D1 and D2).

The mold frame 300 includes a first area (portion) 310 and a second area (portion) 320. The first area 310 extends toward the second opening OP2. The first area 310 may widthwise extend in the second direction toward the second opening OP2. The first area 310 has a stepped shape in a cross-sectional view. More particularly, the first area 310 includes a plurality of horizontal portions to define a step difference therebetween and a vertical portion extending downward to effectively connect the horizontal portions to each other.

The optical member 210 and the display panel 100 are placed inside the frame shape of the mold frame 300. That is, outer edge portions of the display panel 100 and the optical member 210 are disposed on upper surfaces of the horizontal portions of the first area 310. Since the first area 310 of the mold frame 300 has the stepped shape defined by the horizontal portions thereof, a step difference is formed between the light guide plate 220, the optical member 210 placed inside the mold frame 300, and the display panel 100.

Accordingly, the light guide plate 220, the optical member 210 and the display panel 100 are disposed in different planes from each other, do not make contact with each other and are spaced apart from each other in the cross-sectional view.

The second area 320 is connected to an outer portion of the first area 310 and extends in the lower direction. An inside surface of the second area 320 is disposed to surround outside surfaces of the sidewalls 420 of the accommodating member 400. The mold frame 300 may define each of the first area 310 and the second area 320. One of the first area 310 and the second area 320 may extend to define the other one of the first area 310 and the second area 320.

The second covering portion 520 of the covering member 500 is disposed to surround outside surfaces of the first area 310 and the second area 320 of the mold frame 300. In detail, inside surfaces of the second covering portion 520 make contact with the outside surfaces of the mold frame 300.

The bottom portion 410 of the accommodating member 400 makes contact with a lower surface of the reflection sheet 230. The sidewalls 420 of the accommodating member 400 maintain positions of a rear surface of the light source substrate SUB and side surfaces of the light guide plate 220 except for the one side surface of the light guide plate 220 facing the light source substrate SUB.

The light source substrate SUB is disposed on an inside surface of the accommodating member 400. More particularly, the light source units LSU are mounted on a front surface of the light source substrate SUB. A rear surface of the light source substrate SUB opposing the front surface thereof is disposed to make contact with an inside surface of the sidewall 420 facing the one side surface of the light guide plate 220. The light source units LSU are arranged along the one side surface of the light guide plate 220 and disposed to face the one side surface of the light guide plate 220. Thus, the light provided from the light source units LSU is incident to the light guide plate 220 through the one side surface of the light guide plate 220.

According to the exemplary embodiment of the invention, the display device 1000 may further include a stopper STP provided in plural. The stoppers STP are disposed between the light source substrate SUB and the light guide plate 220 in the second direction D2. In detail, the stoppers STP are disposed at both of opposing ends of the light source substrate SUB in the first direction D1.

Where a distance between the light guide plate 220 and the light source LS is relatively small, a yellowing phenomenon may occur at the light guide plate 220 and/or the light guide plate 220 may be warped due to heat generated from the light source LS. The stoppers STP reduce or effectively prevent the distance between the light guide plate 220 and the light source LS from being reduced and becoming short.

The light guide plate 220 accommodated in the accommodating member 400 may be deformed in operation of the display device 1000. In detail, the light guide plate 220 may expand or contract due to the heat generated from the light source LS or from moisture, and thus the light guide plate 220 may be warped. When the light guide plate 220 is warped, the distance between the light guide plate 220 and the light source LS may increase. Thus, where the distance between the light guide plate 220 and the light source LS increases, the light efficiency of the display device 1000 may be undesirably reduced.

The fixing members 430 are disposed on the inside surface of the sidewall 420 facing the sidewall 420 on which the light source substrate SUB is disposed among the sidewalls 420 of the accommodating member 400. That is, the fixing members 430 are disposed between the light guide plate 220 and the sidewall 420 of the accommodating member 400. The fixing member 430 reduces or effectively prevents movement of the light guide plate 220 inside the accommodating member 400.

In FIG. 3A, the fixing member 430 is disposed only on the sidewall 420 facing the light source LS, but should not be limited thereto or thereby. That is, the fixing member 430 may be further disposed on both sidewalls 420 of the accommodating member 400 in the first direction D1. In detail, the fixing members 430 may be disposed at three sidewalls 420 among the sidewalls 420 of the accommodating member 400 except for the sidewall 420 on which the light source LS is disposed. FIG. 3B shows the fixing members 430 disposed at the three sidewalls 420.

As shown in FIG. 3A and FIG. 3B, a length of the fixing member 430 disposed on the sidewall 420 facing the light source LS may extend in the first direction D1 while a length of the fixing member 430 disposed at the other of the three sidewalls may extend in the second direction D2, but should not be limited thereto. In an alternative exemplary embodiment, lengths of a fixing member 430 may extend in the third direction such as is illustrated in FIG. 2.

Figure 4:
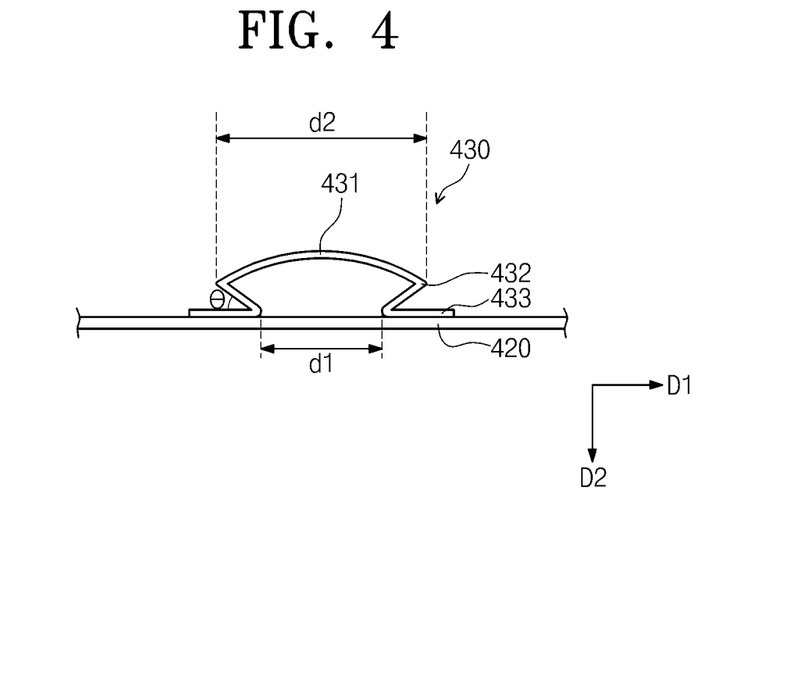
FIG. 4 is a top plan view showing an exemplary embodiment of a fixing member according to the invention.

FIG. 4 is a top plan view showing an exemplary embodiment of a fixing member according to the invention.

Referring to FIG. 4, the fixing member 430 has rigidity in the second direction D2. In an exemplary embodiment, the fixing member 430 includes a metal material, but should not be limited thereto or thereby. That is, the fixing member 430 may include a material having elasticity.

The fixing member 430 includes a supporting portion 431, a plurality of connecting portions 432 and a plurality of fixing portions 433.

A predetermined area of the supporting portion 431 makes contact with a side surface of the light guide plate 220. The supporting portion 431 has a convex curved surface shape toward the side surface of the light guide plate 220 in the second direction D2, however should not be limited thereto or thereby. That is, the supporting portion 431 may have a flat shape such that an entire surface of the supporting portion 431 makes contact with a side surface of the light guide plate 220.

The connecting portions 432 are respectively connected to opposing ends of the supporting portion 431 in the first direction D1 and extend from the supporting portion 431 in the second direction D2.

The connecting portions 432 respectively extend in the second direction D2 from the supporting portions 431 and are connected to corresponding fixing portions of the fixing portions 433. The connecting portions 432 are connected to an inside portion of the fixing portions 433 in the first direction D1.

In more detail, taken in the second direction D2 of FIG. 4, an upper end of each of the connecting portions 432 is connected to the supporting portion 431, and a lower end of each of the connecting portions 432 is connected to the fixing portions 433.

Each of the fixing portions 433 is disposed at an end of the fixing member 430 among the opposing ends thereof in the first direction D1. In detail, the fixing portions 433 are disposed to be spaced apart from each other in the first direction D1 and fixed to the sidewall 420 of the accommodating member 400.

The fixing portion 433 may be coupled and fixed to the sidewall 420 of the accommodating member 400 by a coupling member (not shown). The coupling member may penetrate through the sidewall 420 of the accommodating member 400. In an exemplary embodiment, the coupling member (not shown) may be a bolt or a screw, however, should not be limited thereto or thereby. That is, the fixing portion 433 may be coupled and fixed to the sidewall 420 by a non-penetrating coupling member such as an adhesive tape or a coupling groove defined in the sidewall 420 of the accommodating member 400.

In the first direction D1, a distance d1 between the fixing portions 433 may be smaller than a width d2 of the supporting portion 431. Thus, referring to FIG. 4, the connecting portions 432 connected to the supporting portion 431 each extend downward in the second direction D2 toward the inside portion of the fixing portions 433. An angle Θ between the fixing portions 433 and the connecting portions 432 is an acute angle smaller than about 90 degrees.

Since the fixing portions 433 and the connecting portions 432 form the acute angle, the upper portion of the connecting portion 432 may move up and down in the second direction D2 with respect to the sidewall 420. That is, a distance by which the supporting portion 431 is spaced apart from the sidewall 420 of the accommodating member 400 may be changed. Accordingly, the fixing member 430 may have elasticity.

In general, the light guide plate 220 accommodated in the accommodating member 400 may be deformed in operation of the display device 1000. In detail, the light guide plate 220 may expand or contract due to the heat generated from the light source LS or from moisture. As a result, the distance between the light guide plate 220 and the light source LS may increase and the light efficiency of the display device 1000 may be undesirably reduced. According to the display device 1000, since the fixing member 430 has elasticity, a force which pushes the light guide plate 220 toward the light source LS is continuously generated. Therefore, the distance between the light guide plate 220 and the light source LS is maintained by the fixing member 430.

Where the distance between the light guide plate 220 and the light source LS is maintained by the fixing member 430, one or more exemplary embodiment of the display device 1000 according to the invention may reduce or effectively prevent undesirable movement of the light guide plate 220 therein and improve a display quality thereof.

Figure 5:
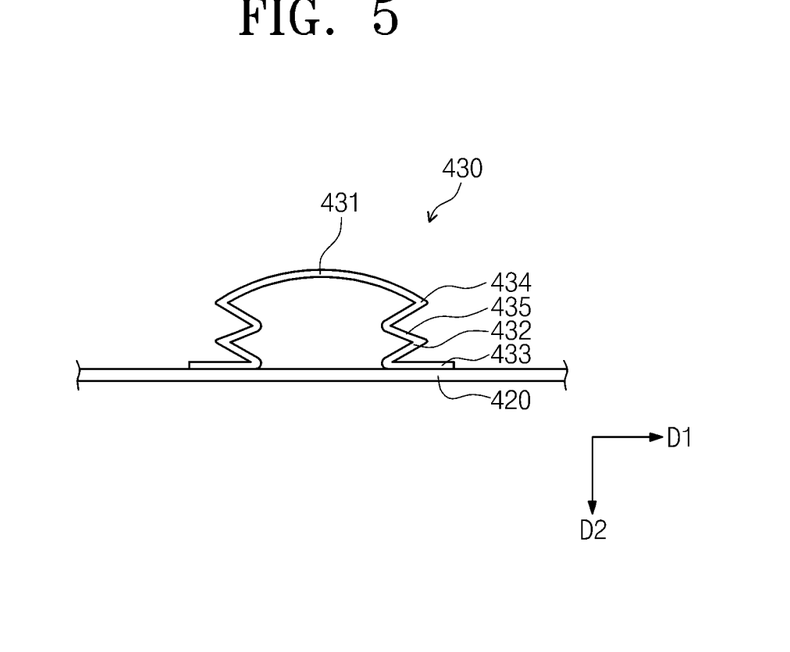
FIG. 5 is a top plan view showing another exemplary embodiment of a fixing member according to the invention.

FIG. 5 is a top plan view showing another exemplary embodiment of a fixing member according to the invention. Referring to FIG. 5, the fixing member 430 further includes a plurality of sub-connecting portions 434 and 435. In an exemplary embodiment, the fixing member 430 includes a plurality of first sub-connecting portions 434 and a plurality of second sub-connecting portions 435 between the connecting portion 432 and the supporting portion 431.

The connecting portion 432, the first sub-connecting portions 434 and the second sub-connecting portions 435 are connected to each other to form a zigzag shape in the top plan view. In more detail, taken in the second direction D2 of FIG. 5, an upper portion of the first sub-connecting portion 434 is connected to the supporting portion 431. A lower portion of the first sub-connecting portion 434 is connected to an upper portion of the second sub-connecting portion 435, and a lower portion of the second sub-connecting portion 435 is connected to an upper portion of the connecting portion 432. A lower portion of the connecting portion 432 is connected to the fixing portion 433.

The connecting portion 432 and the first sub-connecting portion 434 are inclined toward an inner side of the fixing member 430 taken in a direction in which the connecting portion 432 and the first sub-connecting portion 434 extends downward toward the sidewall 420. The second sub-connecting portion 435 is inclined toward an outer side of the fixing member 430 in a direction in which the second sub-connecting portion 435 extends downward toward the sidewall 420.

In the exemplary embodiment, the fixing member 430 includes a plurality of sub-connecting portions 434 and 435 and thus the fixing member 430 has elasticity higher than that of the fixing member 430 including one connecting portion 432. Thus, the fixing member 430 according to the exemplary embodiment also reduces or effectively prevents movement of the light guide plate 220 within the display panel 1000.

Figure 6:
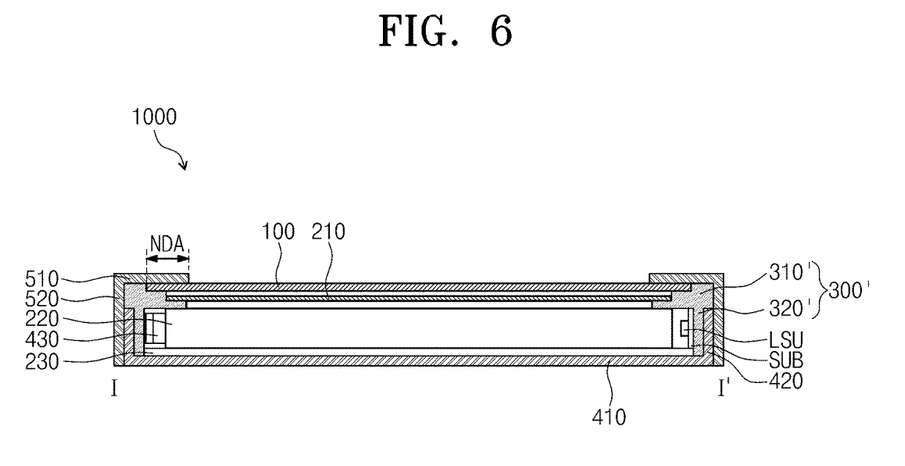
FIG. 6 is a cross-sectional view showing another exemplary embodiment of a display device according to the invention.

FIG. 6 is a cross-sectional view showing another exemplary embodiment of a display device according to the invention.

In FIG. 6, the same reference numerals denote the same elements in previous exemplary embodiments, and thus the detailed descriptions of the same elements will be omitted.

Referring to FIG. 6, in the display device 1000, a second area 320' of a mold frame 300' is accommodated in an accommodating member 400. That is, inside surfaces of sidewalls 420 of the accommodating member 400 make contact with outside surfaces of the second area 320' of the mold frame 300'.

A light source LS is disposed on one inside surface among the inside surfaces of the second area 320' and a fixing member 430 is disposed on one inside surface of the second area 320' facing the inside surface on which the light source LS is disposed.

In general, a light guide plate 220 accommodated in the accommodating member 400 may be deformed in operation of the display device 1000. In detail, the light guide plate 220 may expand or contract due to heat generated from the light source LS or from moisture. When the light guide plate 220 deformed, a distance between the light guide plate 220 and the light source LS may increase and a light efficiency of the display device 100 may be undesirably reduced.

According to one or more exemplary embodiment of the display device 1000, since the fixing member 430 has elasticity, a force to push the light guide plate 220 toward the light source LS is constantly generated. Thus, the distance between the light guide plate 220 and the light source LS is maintained by the fixing member 430.

Consequently, in one or more exemplary embodiment of the display device 1000 according to the invention may reduce or effectively prevent movement of the light guide plate 220 and improve the display quality of the display device 1000.

Although exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A display device comprising:
a display panel which displays an image using a light;
a light source which generates the light;
a light guide plate which receives the generated light from the light source and guides the received light toward the display panel, the light guide plate defining a side surface thereof in plural;
an accommodating member which accommodates the light source and the light guide plate therein, the accommodating member comprising a sidewall provided in plural; and
a fixing member provided in plural between the sidewall of the accommodating member and the side surface of the light guide plate, the fixing member defining
a supporting portion thereof which contacts the side surface of the light guide plate;
a plurality of fixing portions thereof which is fixed to the sidewall of the accommodating member and disposed to be spaced apart from each other; and
a connecting portion thereof which is provided in plural and connects an end among opposing ends of the supporting portion to a fixing portion among the fixing portions, respectively,
wherein an acute angle is formed between the fixing portion and the connecting portion which connects the end of the supporting portion to the fixing portion.

2. The display device of claim 1, wherein the fixing portion, the connecting portion and the supporting portion are sequentially connected to each other in a zigzag shape.

3. The display device of claim 1, wherein a distance between the fixing portions spaced apart from each other is smaller than a distance between the opposing ends of the supporting portion.

4. The display device of claim 1, wherein
the accommodating member further comprises a bottom portion extended from the plural sidewalls thereof,
the light source is disposed between the light guide plate and a first sidewall of the accommodating member, and
the fixing members are disposed between the light guide plate and a second sidewall of the accommodating member opposing the first sidewall thereof.

5. The display device of claim 4, wherein the supporting portion has a convex curved surface shape from the second sidewall of the accommodating member toward the side surface of the light guide plate.

6. The display device of claim 5, wherein the fixing member further defines a sub-connecting portion which connects the connecting portion and the supporting portion to each other, and the connecting portion and the sub-connecting portion are connected to each other in a zigzag shape.

7. The display device of claim 6, wherein the fixing member comprises a metal material.

8. The display device of claim 6, wherein the fixing member is fixed to the second sidewall of the accommodating member by a coupling member which penetrates through the second sidewall of the accommodating member.

9. The display device of claim 8, wherein the light source disposed between the first sidewall of the accommodating member and the light guide plate comprises:
a light source substrate disposed lengthwise adjacent to a side surface of the light guide plate opposite to the side surface at which the fixing member is disposed; and
a light source unit provided in plural mounted on the light source substrate.

10. The display device of claim 9, further comprising a plurality of stoppers which is disposed respectively between the light guide plate and opposing ends of the light source substrate, and maintains a distance between the light source and the light guide plate.

11. The display device of claim 10, further comprising:
a reflection sheet which is disposed between the light guide plate and the bottom portion of the accommodating member and reflects light provided from the light guide plate toward the display panel; and
an optical member which is disposed between the light guide plate and the display panel, diffuses and condenses the light provided from the light guide plate, and provides the diffused and condensed light to the display panel.

12. A display device comprising:
a display panel which displays an image using a light;
a light source which generates the light;
a light guide plate which receives the light from the light source and guides the received light toward the display panel, the light guide plate defining a side surface thereof in plural;
an accommodating member which accommodates the light source and the light guide plate therein;
a mold frame which is disposed under the display panel and has a frame shape, the mold frame comprising a sidewall provided in plural disposed inside the accommodating member; and
a fixing member provided in plural between the sidewall of the mold frame and the side surface of the light guide plate, the fixing member comprising:
a supporting portion thereof which contacts the side surface of the light guide plate;
a plurality of fixing portions thereof which is fixed to an inner surface of the sidewall of the mold frame and disposed to be spaced apart from each other; and
a connecting portion thereof which is provided in plural and connects an end among opposing ends of the supporting portion to a fixing portion among the fixing portions, respectively, wherein an acute angle is formed between the fixing portion and the connecting portion which connects the end of the supporting portion to the fixing portion.

13. The display device of claim 12, wherein the light source is disposed between the light guide plate and a first sidewall of the mold frame disposed inside the accommodating member, and the fixing members are disposed between the light guide plate and a second sidewall of the mold frame disposed inside the accommodating member opposing the first sidewall thereof.

14. The display device of claim 13, wherein the supporting portion is fixed to the inner surface of the second sidewall of the mold frame via the fixing portions and the connecting portions, and is movable toward and away from the inner surface of the second sidewall of the mold frame.

15. The display device of claim 13, wherein the light source disposed between the first sidewall of the mold frame and the light guide plate comprises:

a light source substrate disposed lengthwise adjacent to a side surface of the light guide plate opposite to the side surface at which the fixing member is disposed; and a light source unit provided in plural mounted on the light source substrate.

16. The display device of claim 15, further comprising a plurality of stoppers which is disposed respectively disposed between the light guide plate and opposing ends of the light source substrate, and maintains a distance between the light source and the light guide plate.

\* \* \* \* \*